United States Patent
Wachtler et al.

(10) Patent No.: US 7,492,747 B2
(45) Date of Patent: Feb. 17, 2009

(54) SECURE PATCH INSTALLATION FOR WWAN SYSTEMS

(75) Inventors: Axel Wachtler, Meissen (DE); Richard Powell, Maidenhead (GB); Michael Grell, Dresden (DE); Ralf Findeisen, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 412 days.

(21) Appl. No.: 11/316,499

(22) Filed: Dec. 21, 2005

(65) Prior Publication Data
US 2007/0028296 A1      Feb. 1, 2007

(30) Foreign Application Priority Data
Jul. 29, 2005    (DE) .................. 10 2005 035 736

(51) Int. Cl.
*H04L 9/32* (2006.01)
(52) U.S. Cl. ............................ 370/338; 455/517; 726/2
(58) Field of Classification Search .............. 455/422.1, 455/517; 370/338; 705/1; 709/224, 229; 726/2
See application file for complete search history.

(56) References Cited

U.S. PATENT DOCUMENTS

6,243,581 B1    6/2001   Jawanda

*Primary Examiner*—Sam Bhattacharya
(74) *Attorney, Agent, or Firm*—Meyertons Hood Kivlin Kowert & Goetzel P.C.

(57) ABSTRACT

The present invention relates methods for patching WWAN (Wireless Wide Area Network) communication devices and corresponding WWAN communication devices, integrated circuit chips and computer-readable media. The WWAN communication device includes a first processor, a second processor and a memory. The first processor is arranged to process patches updating software running on the WWAN communication device. The second processor is arranged to provide a first set of the patches to the first processor. The memory stores a second set of the patches to be processed by the first processor. The second processor is further arranged to send a patch end signal to the first processor, the patch end signal causing the first processor to stop processing of patches provided by the second processor. The first processor is further arranged to process the patches stored in the memory independently of the patch end signal.

20 Claims, 6 Drawing Sheets

SECURE PATCH INSTALLATION FOR WWAN SYSTEMS

BACKGROUND OF THE INVENTION

1. Field of the Invention

The present invention relates to WWAN (Wireless Wide Area Network) communication devices and corresponding methods and integrated circuit chips, and in particular to patch installation in such WWAN communication devices.

2. Description of the Related Art

Wireless networks are flexible data communications systems using wireless media such as radio frequency or infrared technology to transmit and receive data over the air, thereby minimizing the need for wired connections. Thus, wireless networks combine data connectivity with user mobility.

Wireless systems can be configured in a variety of topologies to meet the needs of specific applications and installations. Configurations can easily be changed and range from peer to peer networks suitable for a small number of users to large infrastructure networks that enable roaming over a broad area.

Wireless wide area networks (WWAN) use radio, satellite or mobile phone systems to access data and information from any location in the range of a cell tower connected to a data enabled network. Using the mobile phone as a modem, a mobile computing device, such as a notebook computer, PDA (Personal Digital Assistant) or a device with a stand-alone radio card can receive and send information from a network, e.g., corporate intranet or the Internet. Thus, WWAN networks have the potential to extend the reach of applications or data to virtually the entire earth's surface.

However, this expanded range also increases the vulnerability of WWAN networks.

As WWAN communications devices themselves are complex systems and are deployed to a quickly moving market, they are usually provided with software updates while being in the field. These updates, also referred to as patches, can contain feature additions as well as security fixes for closing security holes. In this way, malicious use of WWAN communication devices or the dissemination of worms across WWAN systems can be prevented.

However, an attacker could still remove such security related functionality. An attacker could even entirely block the loading of patches in a WWAN communication device. For instance, the attacker could record the signals at a regular power up of the WWAN communication device and detect how the "patch end" signaling is done. Then, this signal could be sent to the WWAN communication device at the beginning of a later power up processing which would prevent patching. Furthermore, malicious software even could block loading patches.

Further, many prior art WWAN communication devices suffer from the problem of getting more and more insecure while being in the market. Such systems are exposed to an increased risk of malicious modification. A virus or worm could cause effective attacks. For example, a denial of service attack could be carried out against a WWAN network whereby only one infected active device per radio cell suffices to block the whole system. A virus could also destroy an infected WWAN communication device.

SUMMARY OF THE INVENTION

Therefore, improved WWAN communication devices and corresponding methods and integrated circuit chips are provided that may overcome the disadvantages of the conventional approaches. In particular, embodiments may allow for increasing data security in WWAN communication networks. Other embodiments may reduce the risk of a virus damaging or destroying WWAN communication devices. In further embodiments, the reliability of WWAN communication devices may be improved.

According to an embodiment, a WWAN communication device including a first processor, a second processor and a memory is provided. The first processor is arranged to process patches updating software running on the WWAN communication device. The second processor is arranged to provide a first set of the patches to the first processor. The memory stores a second set of the patches to be processed by the first processor. The second processor is further arranged to send a patch end signal to the first processor, the patch end signal causing the first processor to stop processing of patches provided by the second processor. The first processor is further arranged to process the patches stored in the memory independently of the patch end signal.

Another embodiment relates to an integrated circuit chip for performing WWAN communication. The integrated circuit chip includes a first processing unit, a second processing unit and a storage unit. The first processing unit is arranged to process patches updating software running on the integrated circuit chip. The second processing unit is arranged to send a first set of the patches to the first processing unit. The storage unit stores a second set of the patches to be processed by the first processing unit. The second processing unit is further arranged to send a patch end signal to the first processing unit, the patch end signal causing the first processing unit to stop processing of patches sent by the second processing unit. The first processing unit is further arranged to process the patches stored in the storage unit independently of the patch end signal.

In a further embodiment, a method of patching a WWAN communication device includes operating a first processor to process patches updating the software of the WWAN communication device. The method further includes operating a second processor to provide a first set of the patches to the first processor and storing a second set of the patches in a memory of the WWAN communication device. The step of operating the second processor includes sending a patch end signal to the first processor, the patch end signal causing the first processor to stop processing of patches provided by the second processor. The step of operating the first processor includes processing the patches stored in the memory independently of the patch end signal.

Yet another embodiment includes a computer-readable medium containing computer-executable instructions that, when executed by a WWAN communication device, cause the WWAN communication device to perform a method of patching the WWAN communication device. The method includes operating a first processor to process patches updating the software of the WWAN communication device. The method further includes operating a second processor to provide a first set of the patches to the first processor and storing a second set of the patches in a memory of the WWAN communication device. The step of operating the second processor includes sending a patch end signal to the first processor, the patch end signal causing the first processor to stop processing of patches provided by the second processor. The step of operating the first processor includes processing the patches stored in the memory independently of the patch end signal.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
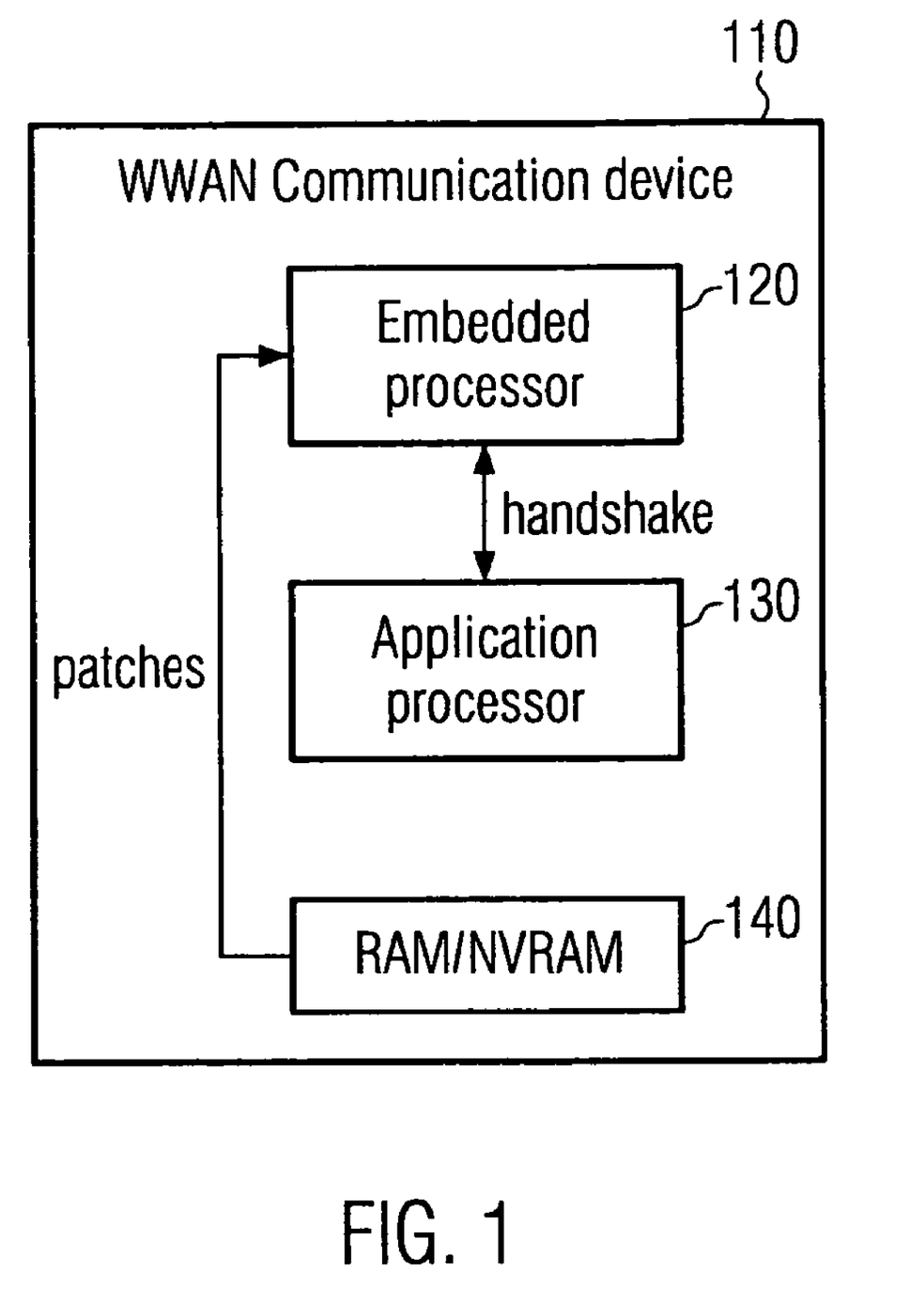
FIG. 1 is a block diagram illustrating components of WWAN communication device according to an embodiment.

Referring now to the Figure drawings and in particular to FIG. 1, a simplified block diagram showing components of a WWAN communication device according to an embodiment is provided. According to the embodiment, the WWAN communication device 110 contains an application processor (AP) 130 and an embedded processor (EP) 120.

The application processor 130 may run an off the shelf operating system (OS) like Linux or WinCE. Due to the OS features, the application processor 130 may be considered untrusted. Hackers could basically manipulate the whole AP system.

The embedded processor 120 will in the following alternatively be referred to as the communication processor. According to the embodiment, it is a closed device and requires the running of trusted software only. Otherwise, attacks like denial of service attacks to the network the WWAN communication device 110 is connected to (e.g., a mobile phone network) may be possible. A virus could also destroy the WWAN communication device 110 ("burn" the radio).

Both the application processor 130 and the communication processor 120 may run software specifically designed for the WWAN communication device 110. According to the embodiment, the software on the application processor 130 (the driver) can be modified by a hacker and is therefore not to be trusted. However, the software on the communication processor 120 (firmware) may prevent malicious use of the WWAN communication device 110. According to the present embodiment, an attacker cannot remove this functionality.

While being in the field, the WWAN communication device 110 may be provided with firmware updates (patches), which may contain feature additions as well as security fixes. The patches themselves may be encrypted and signed so that it may not be possible for an attacker to create own patches or alter existing ones. The present embodiment prevents the application of security fixes contained in a patch to be blocked. Therefore, the present embodiment provides means to enforce the loading of at least one correct patch. Otherwise, the WWAN communication device 110 may cease function.

As shown in FIG. 1, the WWAN communication device 110 includes a memory 140 connected to the communication processor 120. Actually, the system may contain two different sorts of memory: a non-volatile RAM, NVRAM, which might contain patches that are loaded immediately after reset, and a "normal" RAM which may contain heap, stack, and the memory area that contains applied patches (patch memory area).

According to the present embodiment, the non-volatile memory 140 is an NVRAM (Non-volatile Random Access Memory) storage device. In other embodiments however, other types of non-volatile memory, e.g., non-volatile flash memory may be used.

NVRAM memory 140 may contain mainly configuration data gathered at production time. It may also contain patches for known issues and feature enhancements. A network operator may have delivered the WWAN communication device 110 for these patches, or the patches may have been delivered on another distribution channel.

It is noted that FIG. 1 is only a simplified diagram showing part of the WWAN communication device components. Of course, the device 110 may include further elements like a CPU (Central Processing Unit), internal peripherals, etc. At startup time, the firmware running on the embedded processor 120 may run through a state machine which may first load all information from the non-volatile memory 140. According to the present embodiment, an attacker cannot prevent this. Then, the embedded processor 120 may perform a handshake algorithm with the application processor 130. Unless the application processor 130 provides a signed update with the correct signature the WWAN communication device 110 may not start. Therefore, it may not be possible to prevent loading of patches.

The initialization of the embedded processor 120 according to the present embodiment will now be described in more detail with reference to FIGS. 2 to 5. Specifically, the EP initialization process may include two main phases: boot and startup. According to the present embodiment, the EP boot phase consist of assembler code that is based on a reset vector. This code may carry out the fundamental initialization of the EPs CPU core, hardware peripherals and memory in order to provide an environment in which the main functional telecommunications code can operate. The EP startup may describe a set of actions carried out to apply patches from the NVRAM memory 140 and application processor 130, set up security and initialize telecommunications modules of the WWAN communication device 110.

Figure 2:
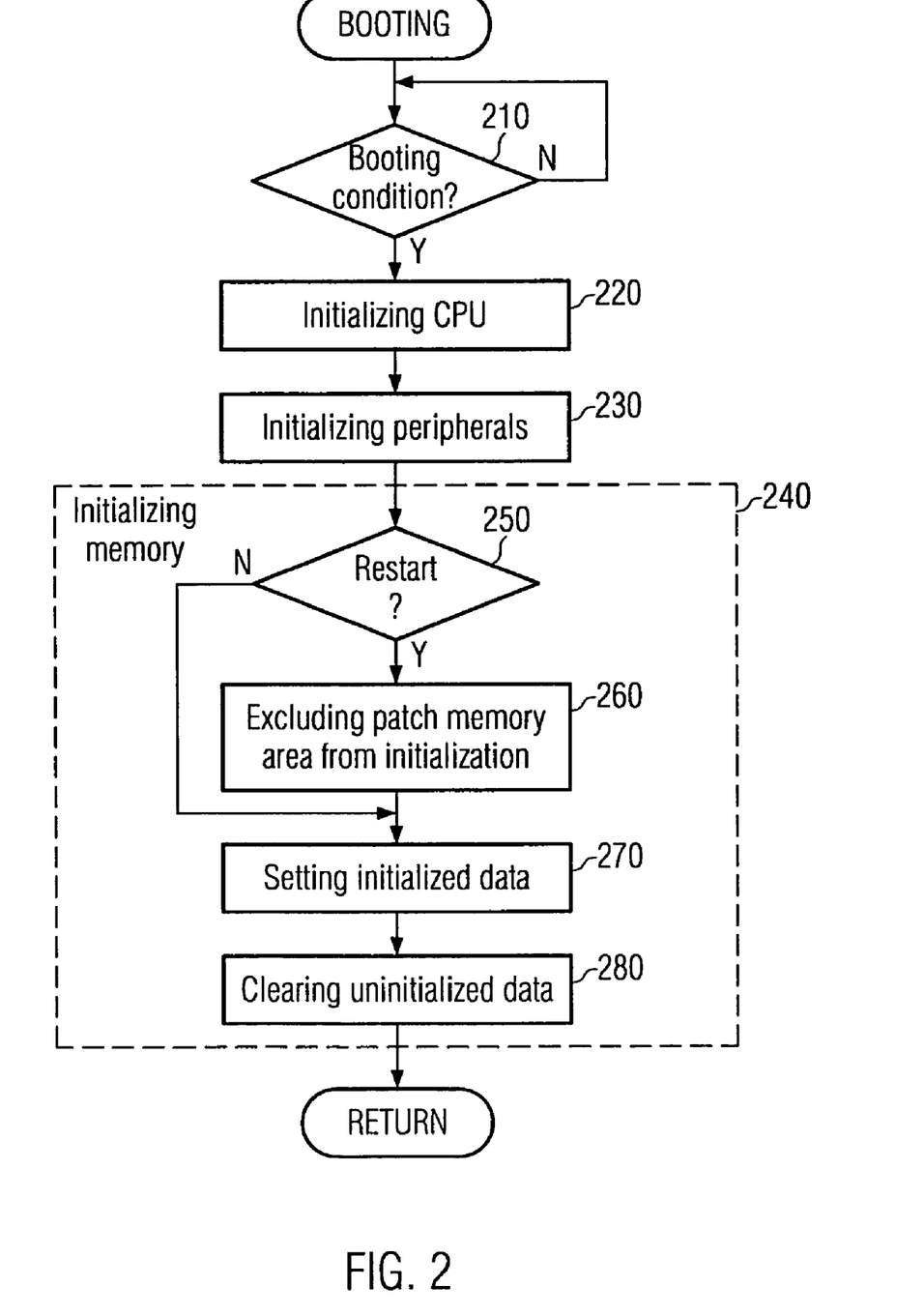
FIG. 2 is a flow diagram showing the steps of a booting process of the WWAN communication device according to an embodiment.

Referring now to FIG. 2, the steps of the EP booting process according to an embodiment are shown. The booting process may be caused by a reset or restart. Accordingly, a waiting loop may be performed in step 210 until such a booting condition is fulfilled. Hardware reset events which may launch the booting process may include, e.g., assertion of a board level reset, expiry of a watchdog timer or assertion of a reset line controlled directly from the application processor 130. Further, a booting condition may exist in case of a software restarting event. This may include the application processor 130 or NVRAM memory 140 forcing a restart to apply patches, a watchdog timer enforcing a restart on programmable time out (before applying a hardware reset) or a restart caused by an EJTAG (Enhanced Joint Test Action Group) debug exception handler, for instance. The restart state may be preserved in a data structure in the patch memory area. During EP boot memory initialization 240, it may be accessed by a call to the patch API (Application Programming Interface).

The above illustrative enumeration of booting conditions is not to be construed as limiting the invention. In some embodiments, further events may cause the booting process to start, while in other embodiments, some of the above events may not necessarily launch EP booting.

Once a booting condition is fulfilled, the EP booting processing may start with configuring the CPU core of the communication processor 120 into the correct state in step 220. During CPU initialization 220, interrupts may be disabled. According to the present embodiment, they are turned on during RTOS (Real Time Operating System) initialization (see FIG. 3). After core configuration, the internal peripherals of the embedded processor 120 may be initialized into a low power state in step 230.

Then, in step 240, the RAM memory 140 may be initialized. This may include determining in step 250 whether the booting condition detected in step 210 was a restart. In case the booting process was caused by a restart event, a certain area of the RAM memory 140 may not be initialized. This piece of memory may be the patch memory area. The restart state information, as well as the start and end of the patch memory, may be provided by an API call to a patch API. Besides the patch memory handling, no further distinction may be made by the booting process of the present embodiment between a reset or a restart. In other embodiments, the memory initialization step 240 may further include an optional memory check.

In step 270, the initialized data segment may be copied from ROM (Read Only Memory) into the appropriate RAM area. The uninitialized data area in the RAM memory 140 may be cleared, i.e., set to 0 in step 280. Addresses for these areas may be taken from link time defined constants. As mentioned above, when a restart is detected in steps 210 and 250, the area of the RAM memory 140 reserved for the patch mechanism will be excluded from the processing in steps 270 and 280 of the present embodiment.

Once the booting process is complete, the WWAN communication device 110 may proceed to the startup processing which will now be explained with reference to FIGS. 3 to 5. According to the present embodiment, the expression "startup" refers to the collection of software activities that are necessary to provide an operating environment for the (e.g., EGPRS: Enhanced General Packet Radio Service) telecommunications protocol stack software representing the main function of the communication processor 120.

Figure 3:
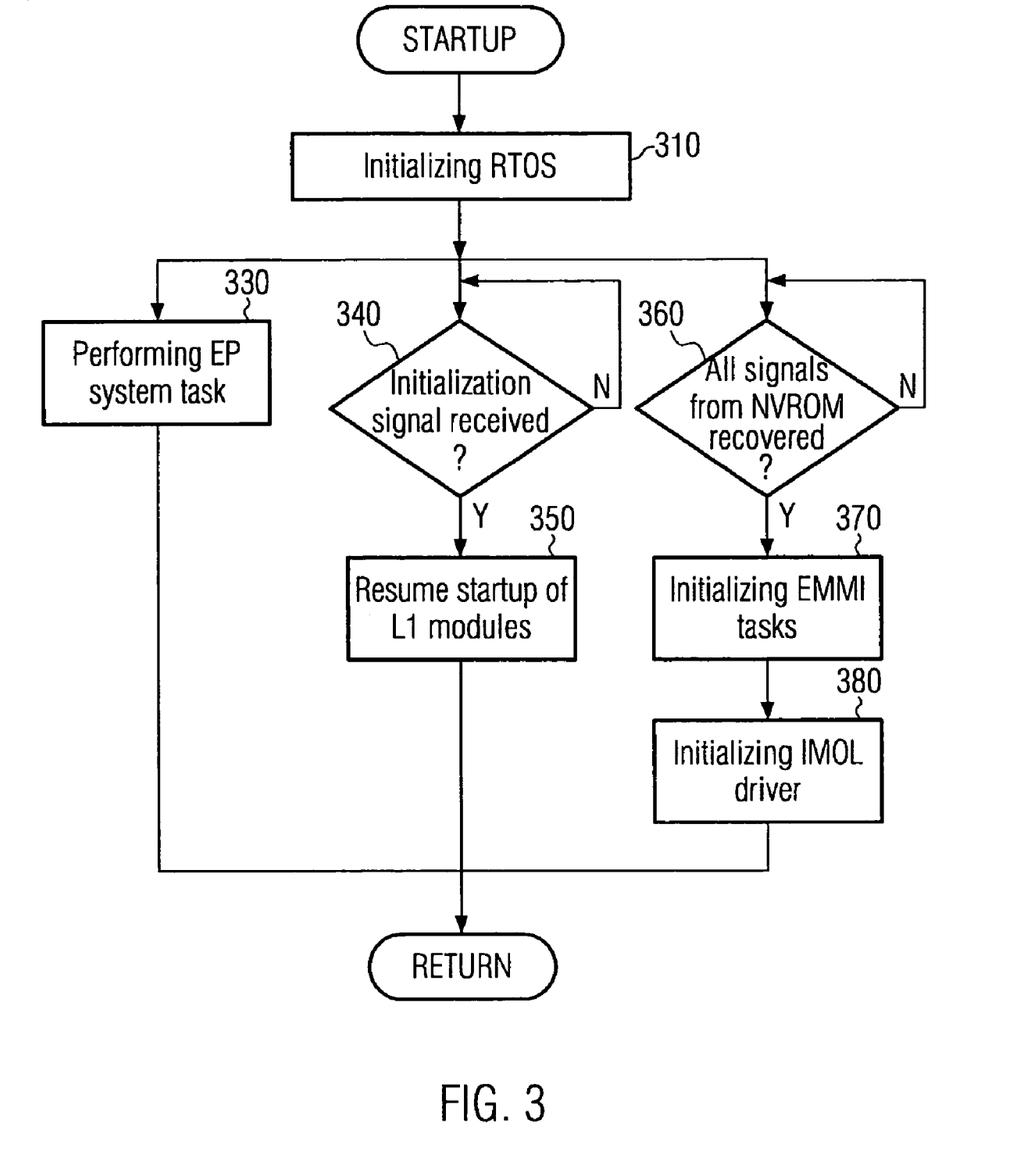
FIG. 3 is a flow diagram including steps of a startup process in a WWAN communication device according to an embodiment.

As shown in FIG. 3, the startup processing may begin at step 310 by calling an RTOS kernel initialization function. The RTOS may then be initialized and all necessary tasks started.

Then a number of processes 330-380 may be performed in parallel. The processes making up the EP startup according to the present embodiment are mostly driven by GKI (Generic Kernel Interface) signals. These signals are intentionally asynchronous and have no implicit order. The ordering of signals necessary to complete a successful EP startup may be, e.g., the responsibility of the application processor 130 or the order they are entered into the NVRAM memory 140.

In step 330 EP system tasks may be performed. According to the present embodiment, the EP system task 330 is implemented to coordinate the startup process. The EP system task 330 may be responsible for processing the patch signals contained in the NVRAM memory 140 as well as the ones received from the application processor 130. All necessary startup handshake procedures combined with the state machine as needed may be accomplished by the EP system task 330.

Restart requests resulting from patches requiring a restart or from other events, e.g., a watchdog timer early warning, etc. may be processed here. Restart handling may include the handshake with the application processor 130 to signal the processing state change of the embedded processor 120. After all required startup setup/handshake procedures have been finalized successfully, the (EGPRS) telecommunications stack may be initialized. Finally, the EP system task 330 may signal to the application processor 130 to be ready for communication. The messages, handshake procedures, etc. performed by the AP and EP system tasks according to the present embodiment will be described in more detail below, with reference to FIGS. 4 and 5.

The startup of level 1 (L1) modules of the WWAN communication device 110 may be accomplished by an L1 background task. In order to apply configuration data from patch signals for the L1 modules, the L1 background task may suspend its startup until it receives an initialization signal from the EP system task 330. To this end, the L1 background task may wait in step 340 until this initialization signal has been received. Once this is the case, it may resume the startup of the L1 modules in step 350. Although not shown in FIG. 3, part of the L1 module set up may already have been performed before step 340 in some embodiments.

In order to control the exchange of signals between the embedded processor 120 and the application processor 130, the WWAN communication device 110 may include an IMOL (Intra Modem Link) driver. The IMOL driver may need some of the values held in the NVRAM memory 140 to be set up before it can function correctly. The values in the NVRAM memory 140 may be recovered as patch signals by the EP system task 330. To prevent the IMOL driver starting without these values, the EP system task 330 of the present embodiment is defined as having a higher priority than the EMMI (Enhanced Man Machine Interface) task that starts the IMOL driver. According to the embodiment, the EP system task 330 does not return control to the operating system until it has recovered all signals from the NVRAM memory 140.

Upon returning execution to the operating system the EP system task waits for the EMMI ready indication signal. This ensures a proper IMOL startup, including possibly patches IMOL startup data applied by a patch from NVRAM. Upon receiving the EMMI ready indication signal signals can be sent to the AP.

The EMMI stack may be provided by two tasks, one at a high priority for dealing with hardware, and one at a low priority for interfacing with the rest of the software. The EMMI tasks may be used by the GKI signal handling when it decides that a GKI signal needs to be routed off the system. According to the embodiment, the EMMI tasks are served by one or more serial devices, through which they communicate with the outside world. These serial devices may be processed through an interface known as SPAL (Serial Port Abstraction Layer) interface. Both the IMOL and the field/debug UART (Universal Asynchronous Receiver Transmitter) may be implemented as SPAL devices. A switch mechanism within the WWAN communication device 110 may allow for routing of GKI messages to/from the appropriate interface.

Once the EMMI tasks have been initialized in step 370, the IMOL driver may be started automatically in step 380. The configuration of the IMOL hardware link according to the embodiment is dependent on data that need to be recovered from the NVRAM memory 140. As the startup processing has waited in step 360 until the EP system task 330 has recovered all signals from the NVRAM memory 140, the IMOL driver is allowed to start in step 380.

Figure 4:
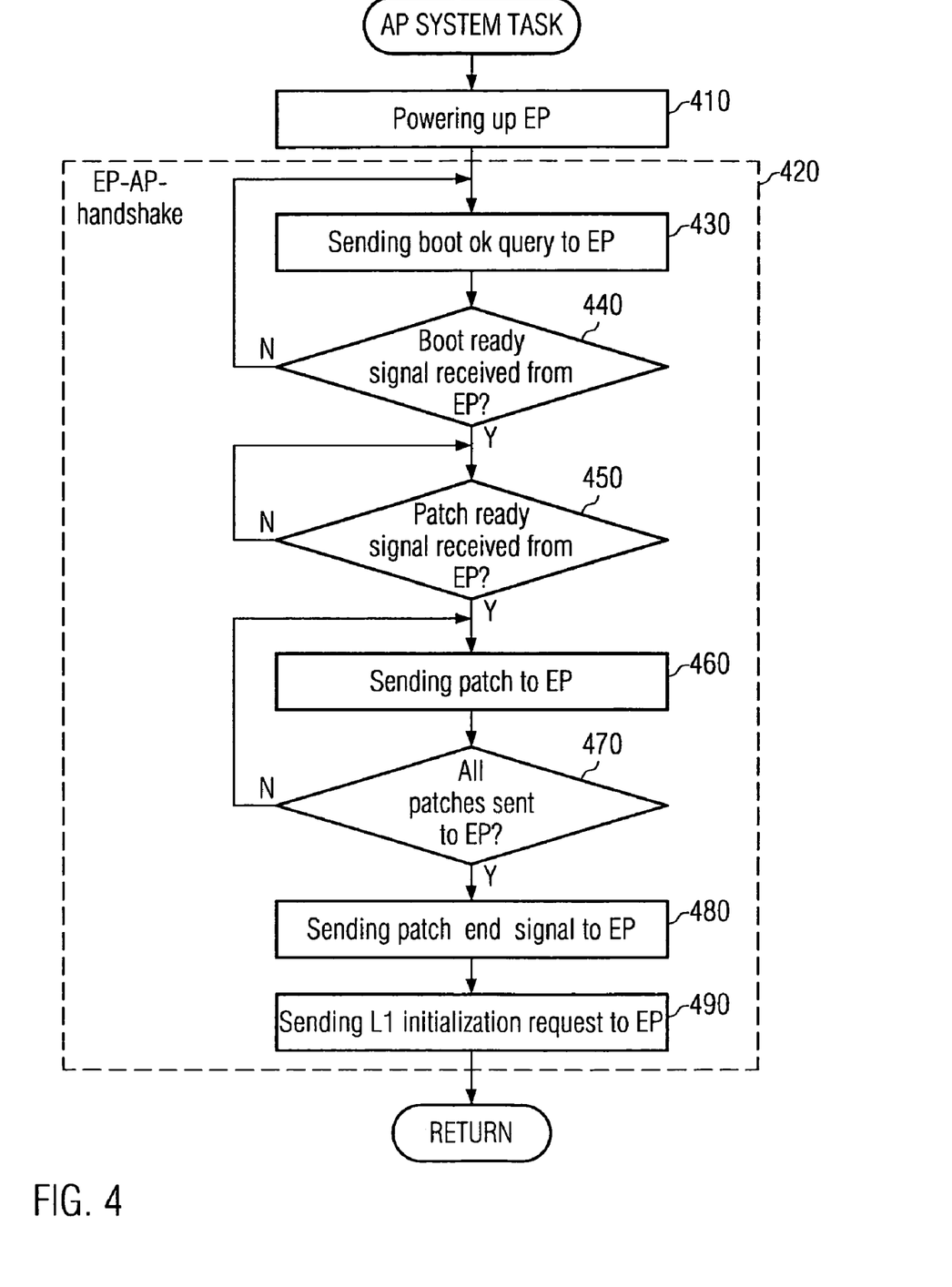
FIG. 4 is a flow diagram illustrating the AP system task of FIG. 3 in more detail.

Turning now to FIG. 4, the AP system task of the present embodiment is shown in more detail. The AP system task may be the peer task of the EP system task 330 on the application processor 130.

In step 410, the AP system task may power up the communication processor 120. Then, the AP system task may poll for completion of the boot process. This may be accomplished by sending a boot ok query to the embedded processor 120 in step 430 to find out whether the embedded processor 120 has finished the boot process. Accordingly, the AP system task may wait in step 440 until a corresponding boot ready signal has been received from the embedded processor 120, indicating that the communication processor 120 has finished the boot process. If the boot ready signal has not been received, the boot ok query may be resent in step 430.

Once the AP system task has received the boot ready signal from the embedded processor 120, it may wait in step 450 for a patch ready signal from the embedded processor 120, indicating that the embedded processor 120 has finished NVRAM processing and is ready to process patches from the application processor 130.

Once the embedded processor 120 has replied to the boot OK query with the boot ready signal and has sent the patch ready signal, then the AP system task may send a patch to the embedded processor 120 in step 460. In step 470, it may be determined whether all patches have been sent to the embedded processor 120. If this is not the case, the AP system task may return to step 460 for sending another patch to the communication processor 120.

According to the present embodiment, radio calibration data is also sent in step 460 although it is just a special patch signal. The AP signal task may have knowledge of the correct ordering of these patches as the embedded processor 120 may perform the patches in the order that they are sent. The application processor 130 may be able to poll for the current status of completion of the patch processing at the embedded processor 120. To find out the status of the patch processing of the embedded processor 120, the application processor 130 may send to the embedded processor 120 a corresponding status query (not shown in FIG. 4). Particularly, the patch system of the present embodiment maintains a list of installed patches. This list may be preserved through a restart. By sending the installed patch ID request signal, the application processor 130 may request this list. Thereupon, a status response signal may be sent by the embedded processor 120 to the application processor 130 to signal the status of the patch processing of the embedded processor 120 as a response to the status query.

The application processor 130 may further get information about installed patches by sending an installed patch ID request signal (not shown in FIG. 4) to the embedded processor 120. In response, the communication processor 120 may pass information about applied patches, e.g., the corresponding patch IDs to the application processor 130.

Once step 470 yields that all patches have been sent, the application processor 130 may indicate the end of the patch session by sending a patch end signal to the embedded processor 120 in step 480.

When an error is detected at any time during the processing, the application processor 130 of the embodiment can request a restart. To do so, the application processor 130 may force the embedded processor 120 to restart by sending a reboot request signal (not shown in FIG. 4) to the embedded processor 120. Accordingly, step 210 may then yield that a booting condition is fulfilled. The processing may then proceed with step 220 of initializing the CPU, taking into account during further processing that the booting condition was a restart. When a reboot is requested internally in the embedded processor 120, for instance by a watchdog timer warning interrupt, the embedded processor 120 may signal an upcoming restart by sending to the application processor 130 a restart indicator signal which the application processor 130 may answer with a restart confirmation signal (not shown in FIG. 4). Thereby, the application processor 130 may signal to the embedded processor 120 that it has accepted the reboot request of the embedded processor 120.

After patch processing is finished, the application processor 130 may send an L1 initialization request to the embedded processor 120 in step 490. Steps 430 to 490 may be part of an EP-AP-handshake 420.

Figure 5A:
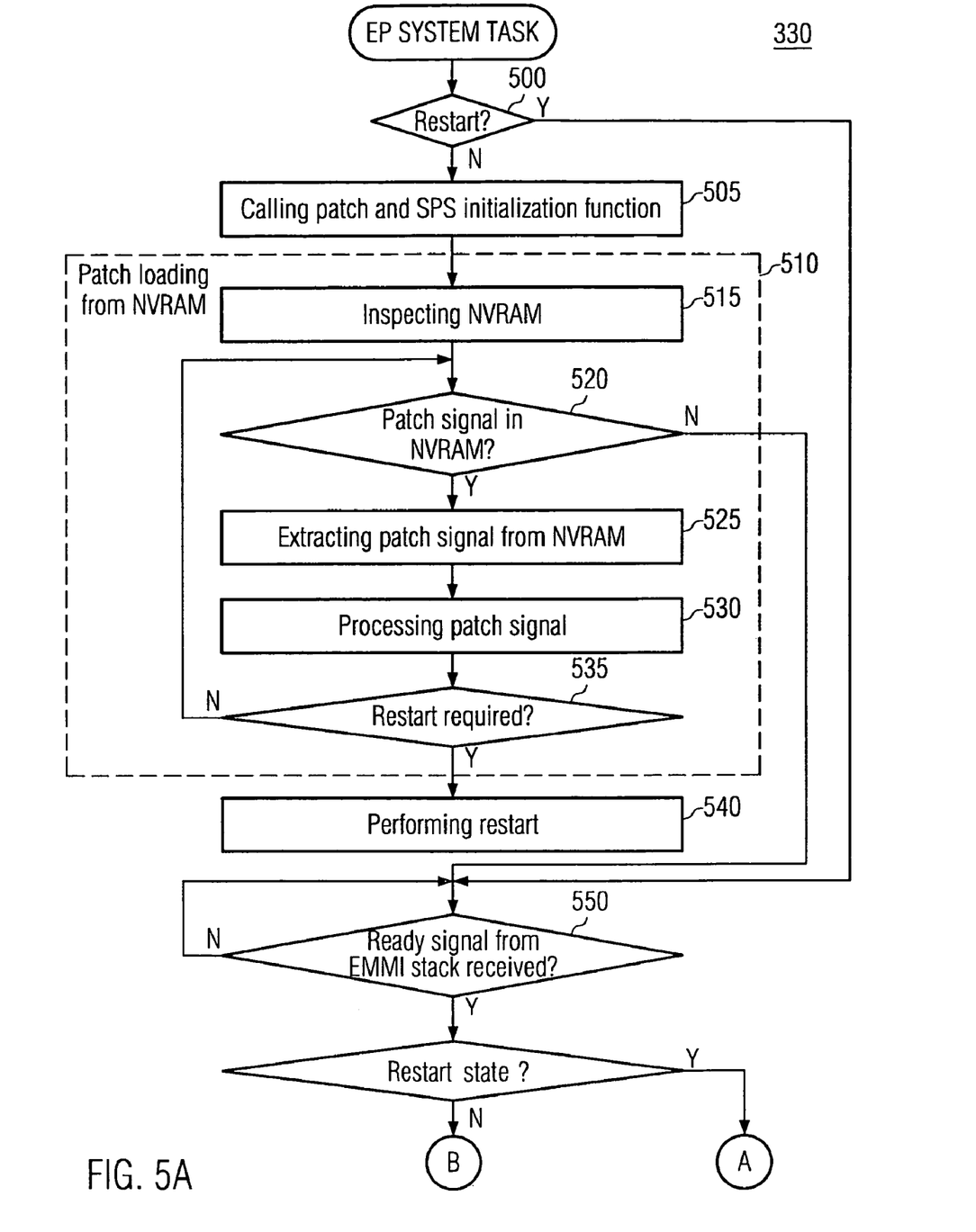
FIGS. 5A and 5B are flow diagrams showing the EP system task of FIG. 3 in more detail.
Figure 5B:
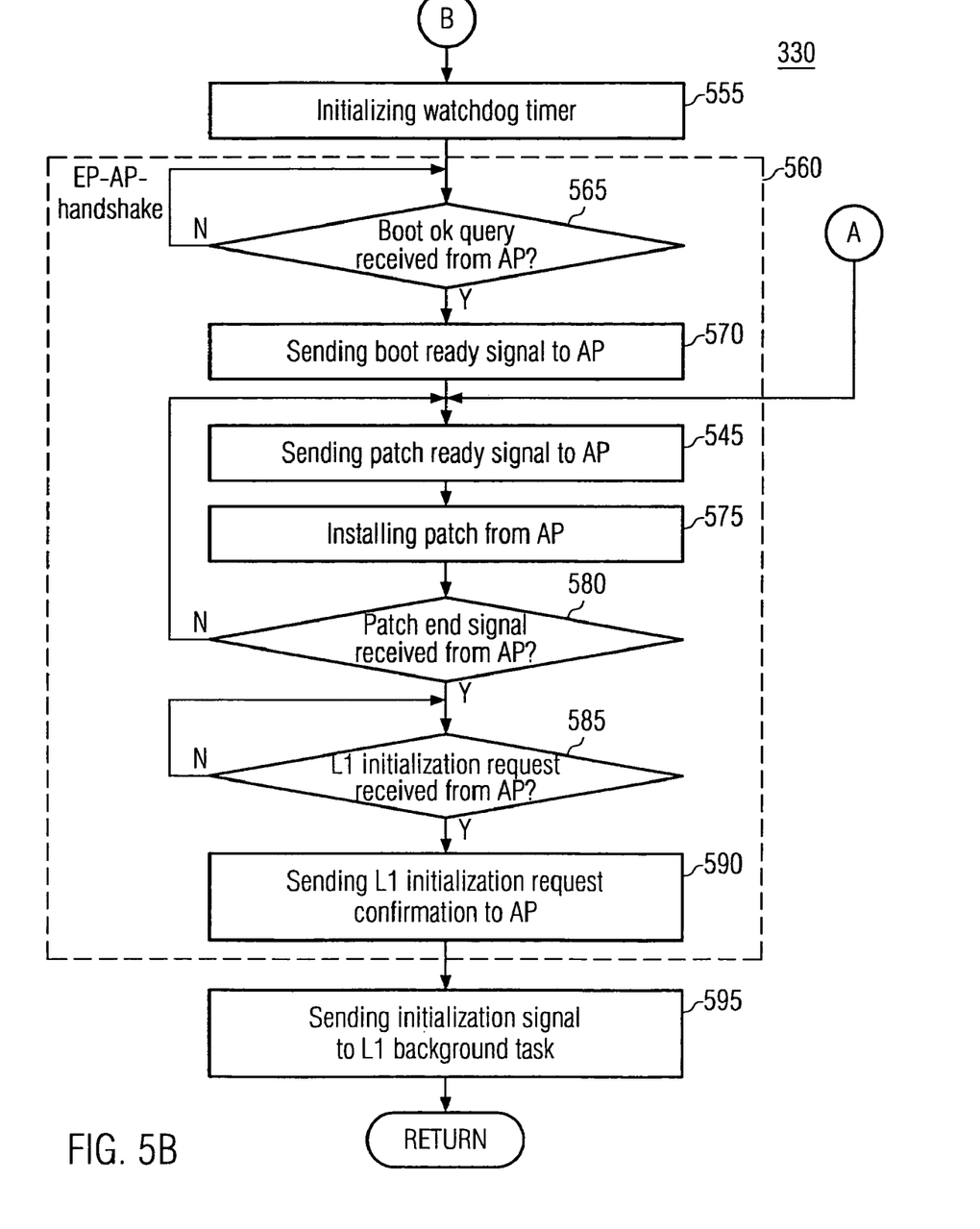

Turning now to FIGS. 5A and 5B, the EP system task 330 is shown in more detail. According to the embodiment, the EP system task 330 controls the EP specific system initialization. It does this based on signals usually received from the application processor 130, as discussed above with reference to FIG. 4. On task startup, it may be checked in step 500, whether the current processing is a restart or not. If it is a restart, no NVRAM processing may be carried out and the EP system task 330 may directly proceed to steps 550, 545 and 575 for installing patches from the application processor 130.

Otherwise, the patch and SPS (Secure Patch System) initialization function may be called in step 505. After that, patches may be loaded from the NVRAM memory 140 in step 510.

Specifically, the NVRAM memory 140 may be inspected in step 515. An area of the NVRAM memory 140 of the embodiment is reserved for EP system task patch signals. If it is determined in step 520 that there are patch signals stored in this area that have not yet been installed by the EP system task 330, these signals may be extracted from the NVRAM memory 140 in step 525. According to the embodiment, the signals in the NVRAM memory 140 are exactly the same GKI patch signals as those that would be sent from the application processor 130 in step 460. The signals may be extracted one at a time and then processed by the EP system task 330 in step 520, as they would be if they had been received from the application processor 130. This mechanism may allow the embedded processor 120 to patch itself before intervention from the application processor 130.

If a restart is required to apply a certain NVRAM patch, this may be detected in step 535. The EP system task 330 may then be abandoned and a restart carried out in step 540. According to the present embodiment, performing a restart generally means that a booting condition is detected in step 210, leading to the CPU being initialized in step 220 as described above with reference to FIG. 2. As explained with reference to step 500, the NVRAM signal extraction may not be carried out following a restart signal. This avoids a loop should a restart signal be embedded in the NVRAM memory 140.

If the determination in step 535 yields that a restart is not required, it may be returned to step 520 to determine whether there is still a patch signal in the NVRAM memory 140 not yet processed by the EP system task 330. If this is not the case, i.e., when the embedded processor 120 has finished the NVRAM processing 510 and is ready to process patches from the application processor 130, the startup processing may be suspended in step 550 until a ready signal is received from the EMMI stack indicating that the EMMI stack is available. From this point, GKI signals can be used for communication according to the embodiment. The ready signal may be received from the low priority EMMI task and detected in step 550.

Once reception of the ready signal from the EMMI stack has been detected, a determination is made on whether or not this a restart case. If so, the process continues with steps 545 and 575. If not, the watchdog timer may be initialized in step 555. In other embodiments, the EP system task 330 may further include a watchdog timer handshake (not entirely shown in FIG. 5), which may be performed following step 550. Thereby it may be determined if the current startup was caused by a watchdog timer reset. In this case, the state machine of the application processor 130 may be reset. To this end the communication processor 120 may send a watchdog timer reset request to the application processor 130 and terminate this loop upon receiving a watchdog timer reset confirmation. Finally, the watchdog timer may be initialized in case security is enabled (determined via the security disabled pin) as shown in step 555.

In step 560, the EP side of the EP-AP-handshake may be performed. First, it may be determined in step 565 whether a boot OK query has been received from the application processor 130. This is the case if the AP system task has sent the boot ok query in step 430. Then, the boot ok query can be answered in step 570 by sending a boot ready signal to the application processor 130. This signal may also include the state of the security pin as a parameter.

Further, a patch ready signal may be sent to the application processor 130 in step 545. This may synchronize the AP and EP system tasks since, as explained above with reference to FIG. 4, the AP system task may wait in step 450 for the patch ready signal to be received from the embedded processor 120.

Thereupon, patches may be processed from the application processor 130 in step 575. As the patches may contain one or more digital signatures, the processing of a patch may include verifying the signatures and, if the signatures are correct, installing the patch. If a software patch applies to a function or data that has already been used, e.g., as part of system initialization or established communications processes, the software may have to restart. The decision as to whether a particular patch requires a restart or not may have been taken when the patch was constructed. The EP system task 330 may get the indication that a restart is required from the patch API via a patch API call.

Further, the embedded processor 120 may detect and answer the above-discussed patch status queries and installed patch ID queries from the application processor 130 and/or send error signals or reboot requests to the application processor 130 in case an error has occurred or if a reboot is requested, respectively (these steps are not shown in FIG. 5). Further signals may be exchanged between the EP and AP processors 120, 130 relating, e.g., to switching to a flight mode or resetting the watchdog timer. Moreover, the EP and/or AP processor 120, 130 may communicate with other components of the WWAN communication device 110.

The patch session may be finalized by the application processor 130 sending a patch end signal to the embedded processor 120 in step 480. Once the signal is received, this may be detected by the embedded processor 120 in step 580. If the signal has not been received, another patch may be sent by the application processor 130 in step 460 which may be installed by the EP processor 120 in step 575.

Otherwise, it may be determined in step 585 whether the application processor 130 has triggered the initialization of the L1 modules by sending the initialization request in step 490. If this is the case, an L1 initialization request confirmation may be returned to the application processor 130 in step 590. Then, the EP system task 330 may send an initialization signal to the L1 background task in step 595 whereupon the startup of the L1 modules may be resumed in step 350.

Finally, the EP system task 330 may send to the AP system task a communication stack ready signal to indicate the embedded processor 120 has finished all startup activities and is now ready for EGPRS communication (not shown in FIG. 5). According to the embodiment, now communication activities can start.

The EP system task 330 may further include sending an error signal (not shown in FIG. 5) to the AP system task at any time to signal an error has occurred when processing a signal by the EP system task 330. Moreover, the EP system task 330 may send a test signal (not depicted in FIG. 5) to the AP system task 330 in any EP state which will be answered by a corresponding test response.

It is noted that the particular sequence of steps shown in FIGS. 2 to 5 has been chosen for illustration purposes only and is not to be construed as limiting the invention. In other embodiments, steps may be arranged in a different order. For example, the AP system task may determine whether the patch ready signal has been received from the embedded processor 120 (step 450) before sending a boot ok query to the embedded processor 120 in step 430. Further, step 545 of sending the patch ready signal to the application processor 130 may be delayed after step 555 of initializing the watchdog timer, or even after step 570 of sending the boot ready signal to the application processor 130.

As apparent from the above description of embodiments, a technique for securely installing patches in a software updatable system is provided. The use of a patch may be enforced to prevent attackers from blocking the loading of patches. The overall process may be accomplished by a boot and startup state machine. This state machine may control the boot (power up of CPU) and startup (software start) of the system. Embedded in this state machine may be a patch system which can communicate its state to the boot and startup task. Even though the embodiments have been discussed with reference to a WWAN communication device 110, the underlying techniques may further be applied, e.g., with any software for embedded systems, communication platforms or software for partly trusted, partly untrusted platforms.

It is noted that in an embodiment, the term reboot may refer to a "cold" start with complete initialization cycles, including those relating to the patch memory, NVRAM process, boot handshake etc. The term restart may then refer to a "warm" start, in order to evaluate the restart state, do exclude patch memory initialization, NVRAM processing, boot handshake etc.

It is further noted that in any of the above described embodiments, patches may be loaded from NVRAM 140 before patches from the application processor 130.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WWAN (Wireless Wide Area Network) communication device comprising:
   a first processor arranged to process patches updating software running on the WWAN communication device;

a second processor arranged to provide a first set of said patches to said first processor; and a memory storing a second set of said patches to be processed by said first processor;

wherein the second processor is further arranged to send a patch end signal to said first processor, the patch end signal causing the first processor to stop processing of patches provided by the second processor; and wherein the first processor is further arranged to process the patches stored in said memory independently of said patch end signal.

2. The WWAN communication device of claim 1, wherein said first processor is further arranged to process all the patches stored in said memory before processing the patches provided by the second processor.

3. The WWAN communication device of claim 1, wherein said first processor is further arranged to send a patch ready signal to said second processor, the patch ready signal indicating that the first processor is ready to process patches provided by the second processor.

4. The WWAN communication device of claim 3, wherein said first processor is further arranged to send said patch ready signal to said second processor only after having processed all the patches stored in said memory.

5. The WWAN communication device of claim 1, wherein each of said patches provided by said second processor comprises at least one digital signature, and wherein said first processor is further arranged to verify said at least one digital signature and to install a patch provided by said second processor only if the at least one digital signature comprised in the patch is correct.

6. The WWAN communication device of claim 5, being operable to communicate with other WWAN communication devices only after said first processor has installed at least one of said patches provided by said second processor.

7. The WWAN communication device of claim 1, wherein said fist processor is further arranged to indicate when all the patches have been processed, and wherein the WWAN communication device is operable to communicate with other WWAN communication devices only after said first processor has indicated that all the patches have been processed.

8. A method of patching a WWAN (Wireless Wide Area Network) communication device, the method comprising:

operating a first processor to process patches updating the software of the WWAN communication device;

operating a second processor to provide a first set of said patches to said first processor; and storing a second set of said patches in a memory of said WWAN communication device;

wherein operating said second processor comprises sending a patch end signal to said first processor, the patch end signal causing the first processor to stop processing of patches provided by the second processor; and wherein operating said first processor comprises processing the patches stored in said memory independently of said patch end signal.

9. The method of claim 8, wherein operating said first processor further comprises processing all the patches stored in said memory before processing the patches provided by the second processor.

10. The method of claim 8, wherein operating said first processor further comprises sending a patch ready signal to said second processor, the patch ready signal indicating that the first processor is ready to process patches provided by the second processor.

11. The method of claim 10, wherein operating said first processor further comprises sending said patch ready signal to said second processor only after having processed by said first processor all the patches stored in said memory.

12. The method of claim 8, wherein operating said first processor further comprises verifying whether there are still patches stored in said memory that have not yet been processed by said first processor.

13. The method of claim 12, wherein operating said first processor further comprises reading said patches stored in said memory that have not yet been processed by said first processor.

14. The method of claim 13, wherein operating said first processor further comprises processing said read patches.

15. The method of claim 13, wherein operating said first processor further comprises detecting whether a patch read from said memory requires a restart operation.

16. The method of claim 12, wherein operating said first processor further comprises stopping processing of the patches stored in said memory by said first processor only upon having verified that there are no more patches stored in said memory that have not yet been processed by said first processor or having detected that a patch read from said memory requires a restart operation.

17. The method of claim 8, wherein each of said patches provided by said second processor comprises at least one digital signature, and wherein operating said first processor further comprises verifying said at least one digital signature and installing a patch provided by said second processor only if the at least one digital signature comprised in the patch is correct.

18. The method of claim 17, further comprising rendering the WWAN communication device operable to communicate with other WWAN communication devices only after said first processor has installed at least one of said patches provided by said second processor.

19. The method of claim 8, wherein operating said fist processor further comprises indicating when all the patches have been processed, and rendering the WWAN communication device operable to communicate with other WWAN communication devices only after said first processor has indicated that all the patches have been processed.

20. A computer-readable medium comprising computer-executable instructions that, when executed by a WWAN communication device, cause the WWAN communication device to perform the acts of:

operating a first processor to process patches updating the software of the WWAN communication device;

operating a second processor to provide a first set of said patches to said first processor; and storing a second set of said patches in a memory of said WWAN communication device;

wherein operating said second processor comprises sending a patch end signal to said first processor, the patch end signal causing the first processor to stop processing of patches provided by the second processor; and wherein operating said first processor comprises processing the patches stored in said memory independently of said patch end signal.

* * * * *